US011971158B1

(12) United States Patent
Qu

(10) Patent No.: US 11,971,158 B1
(45) Date of Patent: Apr. 30, 2024

(54) THREE-WIRE FOUR-WAY LED LAMP STRING

(71) Applicant: Linhai Weihong Christmas Lighting Co., Ltd., Zhejiang (CN)

(72) Inventor: Weiwei Qu, Zhejiang (CN)

(73) Assignee: Linhai Weihong Christmas Lighting Co., Ltd., Linhai (CN)

( * ) Notice: Subject to any disclaimer, the term of this patent is extended or adjusted under 35 U.S.C. 154(b) by 0 days.

(21) Appl. No.: 18/112,405

(22) Filed: Feb. 21, 2023

(30) Foreign Application Priority Data

Dec. 18, 2022 (CN) ......................... 202223391054.4

(51) Int. Cl.
*F21V 23/00* (2015.01)
*F21S 4/10* (2016.01)
*F21Y 115/10* (2016.01)

(52) U.S. Cl.
CPC .............. *F21V 23/001* (2013.01); *F21S 4/10* (2016.01); *F21Y 2115/10* (2016.08)

(58) Field of Classification Search
CPC ........ F21V 23/001; F21S 4/10; F21Y 2115/10
See application file for complete search history.

(56) References Cited

U.S. PATENT DOCUMENTS

| | | | | |
|---|---|---|---|---|
| 10,697,598 | B1 * | 6/2020 | Chen | F21S 4/20 |
| 11,060,674 | B1 * | 7/2021 | Liu | F21V 23/06 |
| 2023/0042162 | A1 * | 2/2023 | He | F21S 4/26 |

* cited by examiner

*Primary Examiner* — Peggy A Neils

(57) ABSTRACT

A three-wire four-way LED lamp string, including a plurality of first LED lamps , a plurality of second LED lamps, a plurality of third LED lamps and a plurality of fourth LED lamps, further including: several first wires, wherein a first electrode of the first LED lamp is electrically connected with a first electrode of an adjacent second LED lamp through a first wire, a first electrode of the second LED lamp is electrically connected with a first electrode of an adjacent third LED lamp through a first wire, a first electrode of the third LED lamp is connected with a first electrode of an adjacent fourth LED lamp through a first wire, and a first electrode of the fourth LED lamp is electrically connected with a first electrode of an adjacent first LED lamp through a first wire.

9 Claims, 4 Drawing Sheets

THREE-WIRE FOUR-WAY LED LAMP STRING

CROSS-REFERENCE TO RELATED APPLICATION

This application claims priority from the Chinese patent application 2022233910544 filed Dec. 18, 2022, the content of which is incorporated herein in the entirety by reference.

TECHNICAL FIELD

The present disclosure relates to an LED lamp string, in particular to a three-wire four-way LED lamp string.

BACKGROUND

LED lamp string is the main ornament of Christmas, which is also an indispensable lighting decorative electronic product for festivities of the general public, homes, storefronts, cultural activities and night scenes in public places and has a broad market.

At present, most LED lamp strings use a two-wire two-way structure, that is, several LED lamps are connected in parallel on two wires, and the polarities of two adjacent LED lamps are provided in opposite states. For example, the anode terminal of the first LED lamp is electrically connected with the first wire, the cathode terminal of the first LED lamp is electrically connected with the second wire, the cathode terminal of the second LED lamp is electrically connected with the first wire, the anode terminal of the second LED lamp is electrically connected with the second wire, and the rest LED lamps are alternately arranged in the above manner.

When a high level is applied to the first wire and a low level is applied to the second wire, the odd-numbered LED lamps are lit, and when a low level is applied to the first wire and a high level is applied to the second wire, the even-numbered LED lamps are lit.

It can be seen according to the two-wire two-way LED lamp string structure described above that the odd-numbered LED lamps are the first street lamps, and the even-numbered LED lamps are the second street lamps, thus forming a two-wire two-way LED lamp string. Under the control of the controller, the first street lamps and the second street lamps can work alternately.

However, with higher and higher requirements of people for LED lamps, the two-wire two-way LED lamp string cannot meet the corresponding requirements, which is specifically as follows.

First, it is necessary to form more ways on the same LED lamp string to produce a better flash effect. At present, there is a structure that four-way lamps are formed on the same LED lamp string, but the structure of the four-way lamp is five-wire four-way. The four-way structure formed by five wires is not only complicated in structure, but also high in cost.

Second, when the structure with more than three ways is realized, an SMD LED lamp is usually electrically connected with the wire. The specific method is to strip off several parts on the whole continuous wire to expose the conductive parts in the wire, then weld the SMD LED with these exposed conductive parts, and finally seal with sealants. However, since the SMD LED is assembled with the wire by a machine, the distance between two adjacent stripped conductive parts cannot be changed, which leads to the situation that the lamp distance needs to be different in some places. The above structure cannot meet the use requirements.

SUMMARY

The present disclosure provides a three-wire four-way LED lamp string, which not only simplifies the structure of the lamp string, but also reduces the cost.

A three-wire four-way LED lamp string, comprising a plurality of first LED lamps, a plurality of second LED lamps, a plurality of third LED lamps and a plurality of fourth LED lamps, further comprising:

several first wires, wherein a first electrode of the first LED lamp is electrically connected with a first electrode of an adjacent second LED lamp through a first wire, a first electrode of the second LED lamp is electrically connected with a first electrode of an adjacent third LED lamp through a first wire, a first electrode of the third LED lamp is connected with a first electrode of an adjacent fourth LED lamp through a first wire, and a first electrode of the fourth LED lamp is electrically connected with a first electrode of an adjacent first LED lamp through a first wire;

several second wires, wherein a second electrode of the first LED lamp is electrically connected with a second electrode of the third LED lamp through a second wire;

several third wires, wherein a second electrode of the second LED lamp is electrically connected with a second electrode of the fourth LED lamp through a third wire.

With the above structure, a three-wire four-way LED lamp string is formed by connecting a first wire, a second wire and a third wire with a first LED lamp to a fourth LED lamp, respectively. Compared with a five-wire four-way LED lamp string, the lamp string with this structure is obviously simplified in structure, thus reducing the cost. Moreover, because the lengths of the first wire, the second wire and the third wire can be selected as required, a three-wire four-way LED lamp string with a controllable lamp distance is formed.

Reference numbers in the figures:

first LED lamps D1, second LED lamps D2, third LED lamps D3, fourth LED lamps D4, first wires L1, second wires L2, third wires L3, sleeves 1, and insulating and isolating parts 2.

DETAILED DESCRIPTION OF THE EMBODIMENTS

The present disclosure will be further explained in detail with reference to the attached drawings and specific embodiments hereinafter.

Figure 1:
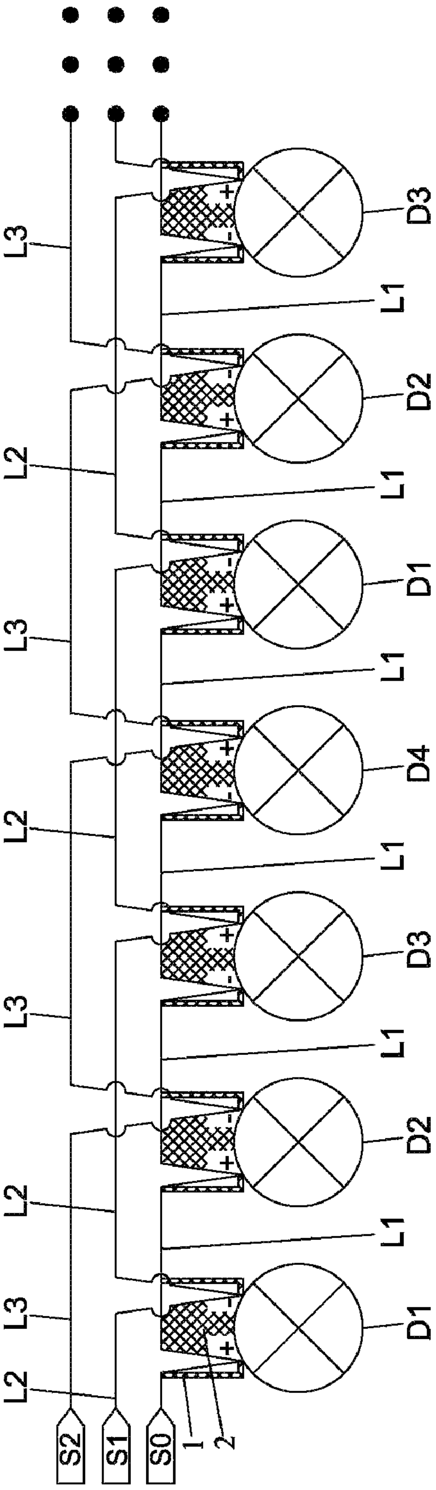
FIG. 1 is a structure diagram of a three-wire four-way LED circuit according to the present disclosure.
Figure 2:
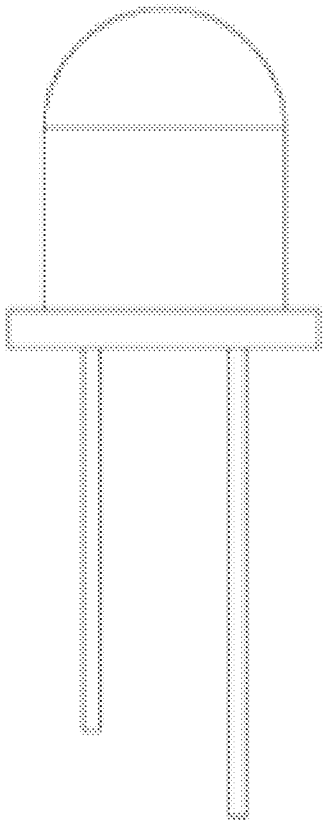
FIG. 2 is a structure diagram of a plug-in LED lamp.

As shown in FIG. 1, the three-wire four-way LED lamp string of the present disclosure comprises a plurality of first LED lamps D1, a plurality of second LED lamps D2, a plurality of third LED lamps D3, a plurality of fourth LED lamps D4, several first wires L1, several second wires L2, and several third wires L3. The first LED lamps D1, the second LED lamps D2, the third LED lamps D3, and the fourth LED lamps D4 in this embodiment are all plug-in LED lamps (as shown in FIG. 2). Each part and the correlation among various parts will be described in detail hereinafter.

As shown in FIG. 1, a first electrode of the first LED lamp D1 is electrically connected with a first electrode of an adjacent second LED lamp D2 through a first wire L1, a first electrode of the second LED lamp D2 is electrically connected with a first electrode of an adjacent third LED lamp D3 through a first wire L1, a first electrode of the third LED lamp D3 is connected with a first electrode of an adjacent fourth LED lamp D4 through a first wire L1, and a first electrode of the fourth LED lamp D4 is electrically connected with a first electrode of an adjacent first LED lamp D1 through a first wire L1.

As shown in FIG. 1, a second electrode of the first LED lamp D1 is electrically connected with a second electrode of the third LED lamp D3 through a second wire L2. In this embodiment, specifically, the third LED lamp D3 with the smallest distance from the first LED lamp D1 is electrically connected with the second electrodes of the first LED lamp D1 and the third LED lamp D3 through a second wire L2.

As shown in FIG. 1, a second electrode of the second LED lamp D2 is electrically connected with a second electrode of the fourth LED lamp D4 through a third wire L3. In this embodiment, specifically, the fourth LED lamp D4 with the smallest distance from the second LED lamp D2 is electrically connected with the second electrodes of the second LED lamp D2 and the fourth LED lamp D4 through a third wire L3.

In FIG. 1, the first LED lamps D1, the second LED lamps D2, the third LED lamps D3 and the fourth LED lamps D4 are arranged in sequence, namely, a first lamp is the first LED lamp D1, a second lamp is the second LED lamp D2, a third lamp is the third LED lamp D3, a fourth lamp is the fourth LED lamp D4, a fifth lamp is the first LED lamp D1, a sixth lamp is the second LED lamp D2, a seventh lamp is the third LED lamp D3, an eighth lamp is the fourth LED lamp D4, and other LED lamps circulate in the above arrangement.

It can be seen according to the above arrangement that the first LED lamp D1 adjacent to the first lamp is the second lamp, that is, the second LED lamp D2. The second LED lamp D2 adjacent to the second lamp is the third lamp, that is, the third LED lamp D3. The third LED lamp D3 adjacent to the third lamp is the fourth lamp, that is, the fourth LED lamp D4. The fourth LED lamp D4 adjacent to the fourth lamp is the fifth lamp, that is, the first LED lamp DE The adjacent modes of other LED lamps circulate as described above.

In the present disclosure, several first wires L1, second wires L2 and third wires L3 are used to connect the above LEDs. On the one hand, the length of each of the first wires L1, the second wires L2 and the third wires L3 can be selected as required. When welding each wire with the LED lamp manually or by a machine, the conductive ends of the first wires L1, the second wires L2 and the third wires L3 are used. Therefore, it is only necessary to use the end of each wire as the basis for welding, so that the distance between two adjacent lamps can be easily controlled.

The length of each of the first wires L1 is 5 to 100 cm. The length of the second wire L2 is 5 to 100 cm. The length of the third wire L3 is 5 to 100 cm. In this embodiment, the lengths of the first wires L1, the second wires L2, and the third wires L3 can all be selected from 5 to 100 cm as required, so as to meet the use requirements.

The first LED lamp D1 has the same polarity as that of the first electrode of the adjacent second LED lamp D2, the second LED lamp D2 has the opposite polarity to that of the first electrode of the adjacent third LED lamp D3, the third LED lamp D3 has the same polarity as that of the first electrode of the adjacent fourth LED lamp D4, and the fourth LED lamp D4 has the opposite polarity to that of the first electrode of the adjacent first LED lamp D1.

The polarities of the above LED lamps are illustrated: the first electrode of the first LED lamp D1 is anode, the second electrode of the first LED lamp D1 is cathode, the first electrode of the second LED lamp D2 is anode, the second electrode of the second LED lamp D2 is cathode, the first electrode of the third LED lamp D3 is cathode, the second electrode of the third LED lamp D3 is anode, the first electrode of the fourth LED lamp D4 is cathode, and the second electrode of the fourth LED lamp D4 is anode.

As can be seen from the schematic diagram of FIG. 1, the first LED lamps D1 and the third LED lamps D3 are alternately connected in parallel between the first wire L1 and the second wire L2. In addition, it can be seen according to the above polarities that the first LED lamps D1 and the third LED lamps D3 are connected with the first wire L1 and the second wire L2 in the state of opposite polarities. This arrangement is shown in the simplified schematic diagram of FIG. 3.

Similarly, the second LED lamps D2 and the fourth LED lamps D4 are alternately connected in parallel between the first wire L1 and the third wire L3. In addition, it can be seen according to the above polarities that the second LED lamps D2 and the fourth LED lamps D4 are connected with the first wire L1 and the third wire L3 in the state of opposite polarities. This arrangement is shown in the simplified schematic diagram shown of FIG. 4. It can be seen from the above that the first wire L1 is a common line.

Figure 3:
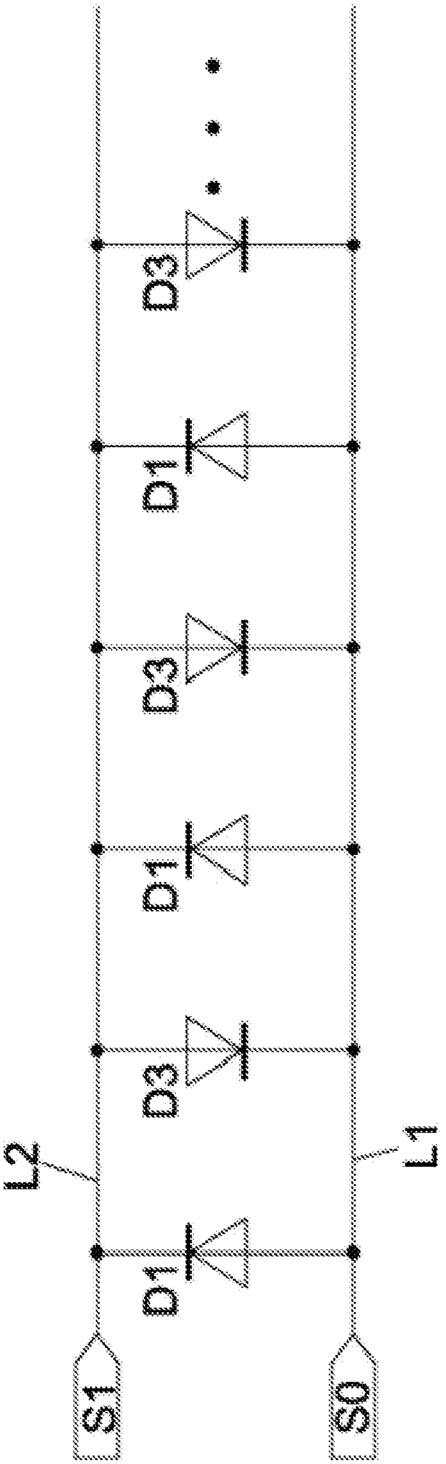
FIG. 3 is a simplified diagram of a first LED lamp separated from FIG. 1 and a first LED lamp connected with a first wire and a second wire.

As can be seen from the simplified diagram of FIG. 3, when S0 is at a high level and S1 is at a low level, all the first LED lamps D1 are turned on and all the third LED lamps D3 cannot be turned on at this time, so that all the first LED lamps D1 are lit, and all the third LED lamps D3 are turned off. When SO is at a low level and S1 is at a high level, all the first LED lamps D1 cannot be turned on and all the third LED lamps D3 are turned on at this time, so that all the first LED lamps D1 are turned off and all the third LED lamps D3 are lit.

Figure 4:
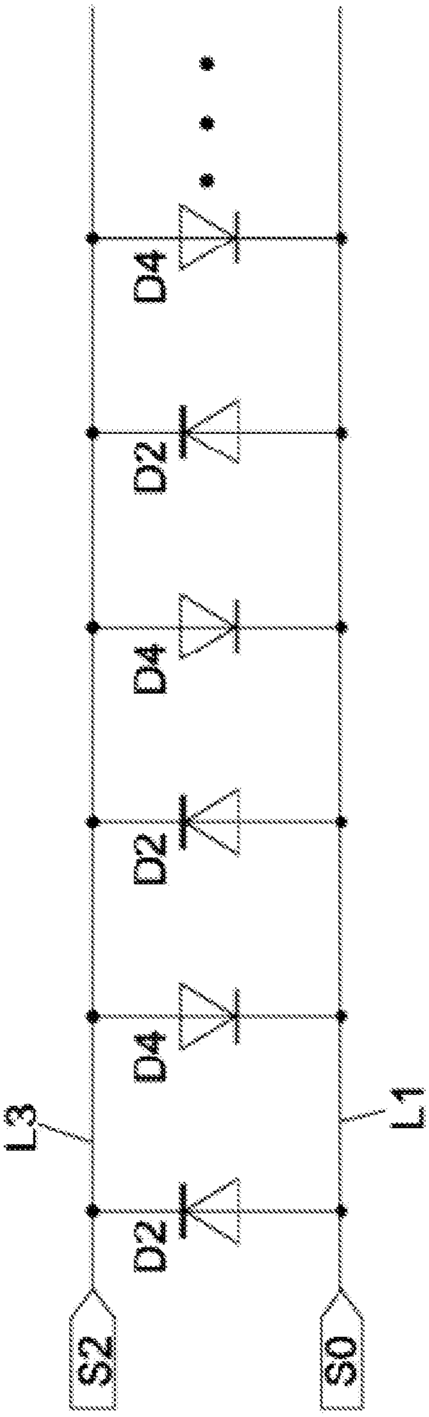
FIG. 4 is a schematic diagram of a second LED lamp separated from FIG. 1 and a fourth LED lamp connected with a first wire and a third wire.

As can be seen from the simplified diagram of FIG. 4, when SO is at a high level and S2 is at a low level, all the second LED lamps D2 are turned on and all the fourth LED lamps D4 cannot be turned on, so that all the second LED lamps D2 are lit, and all the fourth LED lamps D4 are turned off. When SO is at a low level and S2 is at a high level, all the second LED lamps D2 cannot be turned on and all the fourth LED lamps D4 are turned on at this time, so that all the second LED lamps D2 are turned off, and all the fourth LED lamps D4 are lit.

To sum up, the first wire L1, the second wire L2 and the third wire L3 are connected with the first LED lamps D1 to the fourth LED lamps D4, respectively, and the duty ratios of SO, S1 and S2 are controlled, so that the four-way LED lamps are alternately turned on and off, resulting in different lighting effects. It can be seen that the LED lamp string of the present disclosure is a three-wire four-way LED lamp string. Compared with the five-wire four-way lamp string, the lamp string with this structure is obviously simplified in structure, thus reducing the cost. Moreover, because the lengths of the first wire L1, the second wire L2 and the third wire L3 can be selected as required, a three-wire four-way LED lamp string with a controllable lamp distance is formed.

The present disclosure further comprises sleeves 1. The first electrodes and the second electrodes of the first LED lamps D1, the second LED lamps D2, the third LED lamps D3 and the fourth LED lamps D4 are all wrapped with the sleeves 1. The electrode of each of the LED lamps is wrapped with the sleeve 1, which can prevent the electrode from being broken when it is stressed or prevent the welding between the electrode and the wire from falling off. The sleeves 1 are made of plastic or rubber.

The present disclosure further comprises insulating and isolating parts 2. The insulating and isolating parts 2 are provided between the first electrodes and the second electrodes of the first LED lamps D1, the second LED lamps D2, the third LED lamps D3 and the fourth LED lamps D4. The first electrode and the second electrode are isolated by the insulating and isolating part 2, which can avoid short circuit when the first electrodes and the second electrodes are combined together. The insulating and isolating parts 2 are made of plastic or rubber.

Finally, it should be explained that the above embodiments are only the preferred embodiments of the present disclosure to illustrate the technical solution of the present disclosure, rather than limit the technical solution or limit the protection scope of the present disclosure. Although the present disclosure has been described in detail with reference to the aforementioned embodiments, it should be understood by those skilled in the art that the technical solution described in the aforementioned embodiments can be still modified, or some or all of the technical features can be equivalently substituted. These modifications or substitutions do not make the essence of the corresponding technical solutions depart from the scope of protection of the claims.

What is claimed is:

1. A three-wire four-way LED lamp string, comprising a plurality of first LED lamps (D1), a plurality of second LED lamps (D2), a plurality of third LED lamps (D3) and a plurality of fourth LED lamps (D4), further comprising:

several first wires (L1), wherein a first electrode of the first LED lamp (D1) is electrically connected with a first electrode of an adjacent second LED lamp (D2) through a first wire (L1), a first electrode of the second LED lamp (D2) is electrically connected with a first electrode of an adjacent third LED lamp (D3) through a first wire (L1), a first electrode of the third LED lamp (D3) is connected with a first electrode of an adjacent fourth LED lamp (D4) through a first wire (L1), and a first electrode of the fourth LED lamp (D4) is electrically connected with a first electrode of an adjacent first LED lamp (D1) through a first wire (L1);

several second wires (L2), wherein a second electrode of the first LED lamp (D1) is electrically connected with a second electrode of the third LED lamp (D3) through a second wire (L2);

several third wires (L3), wherein a second electrode of the second LED lamp (D2) is electrically connected with a second electrode of the fourth LED lamp (D4) through a third wire (L3).

2. The three-wire four-way LED lamp string according to claim 1, wherein the first LED lamps (D1), the second LED lamps (D2), the third LED lamps (D3) and the fourth LED lamps (D4) are all plug-in LED lamps.

3. The three-wire four-way LED lamp string according to claim 1, wherein the length of each of the first wires (L1) is 5 to 100 cm.

4. The three-wire four-way LED lamp string according to claim 1, wherein the length of the second wire (L2) is 5 to 100 cm.

5. The three-wire four-way LED lamp string according to claim 1, wherein the length of the third wire (L3) is 5 to 100 cm.

6. The three-wire four-way LED lamp string according to claim 1, wherein the first LED lamp (D1) has the same polarity as that of the first electrode of the adjacent second LED lamp (D2), the second LED lamp (D2) has the opposite polarity to that of the first electrode of the adjacent third LED lamp (D3), the third LED lamp (D3) has the same polarity as that of the first electrode of the adjacent fourth LED lamp (D4), and the fourth LED lamp (D4) has the opposite polarity to that of the first electrode of the adjacent first LED lamp (D1).

7. The three-wire four-way LED lamp string according to claim 1, further comprising sleeves (1), wherein the first electrodes and the second electrodes of the first LED lamps (D1), the second LED lamps (D2), the third LED lamps (D3) and the fourth LED lamps (D4) are all wrapped with the sleeves (1).

8. The three-wire four-way LED lamp string according to claim 1, further comprising insulating and isolating parts (2), wherein the insulating and isolating parts (2) are provided between the first electrodes and the second electrodes of the first LED lamps (D1), the second LED lamps (D2), the third LED lamps (D3) and the fourth LED lamps (D4).

9. The three-wire four-way LED lamp string according to claim 7, further comprising insulating and isolating parts (2), wherein the insulating and isolating parts (2) are provided between the first electrodes and the second electrodes of the first LED lamps (D1), the second LED lamps (D2), the third LED lamps (D3) and the fourth LED lamps (D4).

* * * * *